United States Patent [19]

Cavanagh

[11] Patent Number: 4,766,284
[45] Date of Patent: Aug. 23, 1988

[54] PRODUCTION OF COMPOUNDS BY REACTION OF SOLID MATERIALS AT HIGH TEMPERATURES PRODUCED BY PLASMA ARC TORCHES

[75] Inventor: Patrick E. Cavanagh, Toronto, Canada

[73] Assignee: Maghemite Inc., Mississauga, Canada

[21] Appl. No.: 836,530

[22] Filed: Mar. 5, 1986

[30] Foreign Application Priority Data

Mar. 5, 1985 [GB] United Kingdom ............... 8505597

[51] Int. Cl.$^4$ ........................... B23K 9/00; B22F 9/00
[52] U.S. Cl. ......................... 219/121.59; 219/76.16; 219/121.47; 75/0.5 B; 75/10.19; 427/34
[58] Field of Search ............... 219/121 PX, 121 PL, 219/75, 76.15, 121 PQ, 76.16, 121 PA, 121 PY; 75/65 R, 10.19, 10.2, 10.21, 10.22; 427/34

[56] References Cited

U.S. PATENT DOCUMENTS

| | | | |
|---|---|---|---|
| 3,179,784 | 4/1965 | Johnson | 219/76.16 |
| 3,710,070 | 1/1973 | Hirt et al. | 219/121 PL |
| 4,162,914 | 7/1979 | Cremer | 219/121 PY |
| 4,370,538 | 1/1983 | Browning | 219/121 PL |

Primary Examiner—M. H. Paschall
Attorney, Agent, or Firm—Sim & McBurney

[57] ABSTRACT

Reactions between solid materials to form useful products, for example, strontium ferrites, are effected by heating a primary solid feed material with a plasma gas stream to melt the primary feed material and then contacting a secondary solid feed material with the molten primary feed material and the plasma gas stream to melt the secondary feed material and enable reaction among the reactants to occur. The method of the invention simplifies the effecting of solid-solid reactions using plasma gas streams and permits the use of impure materials as the secondary feed material, strontium carbonate or strontium oxide and ferric oxide (hematite), so as to form a strontium ferrite.

13 Claims, 3 Drawing Sheets

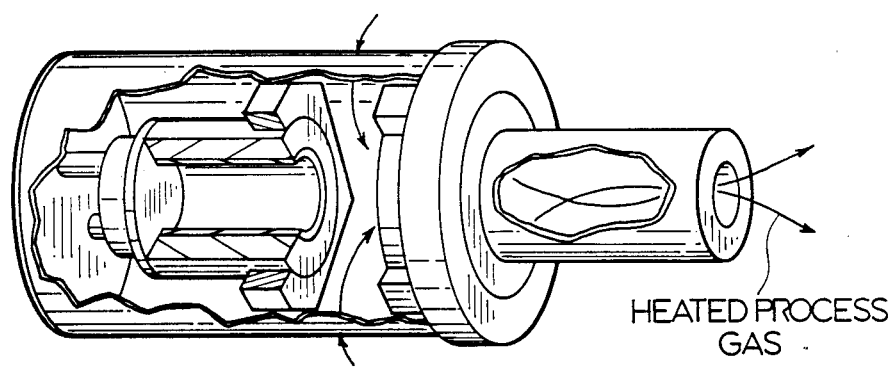
FIG.1.
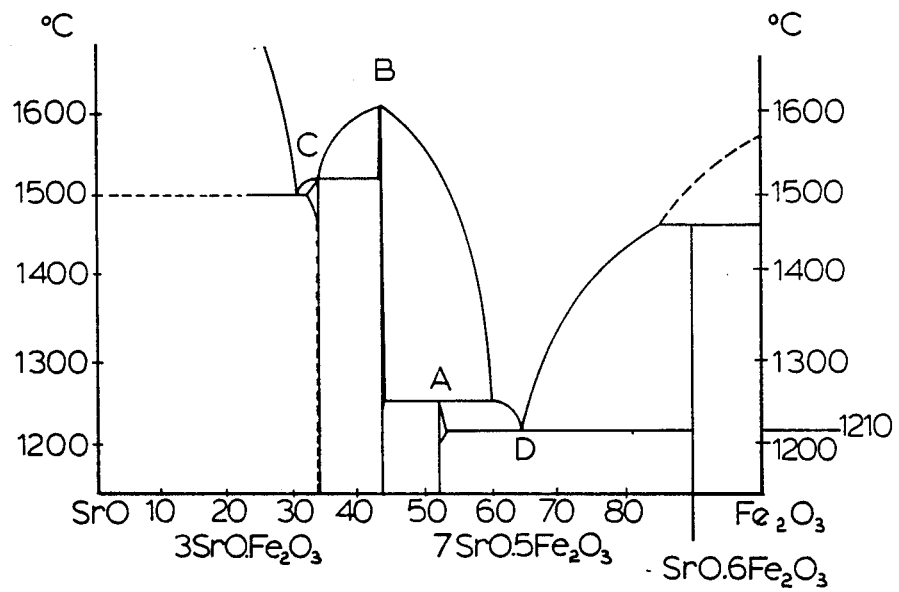
FIG.5.    SYSTEM SrO-Fe$_2$O$_3$

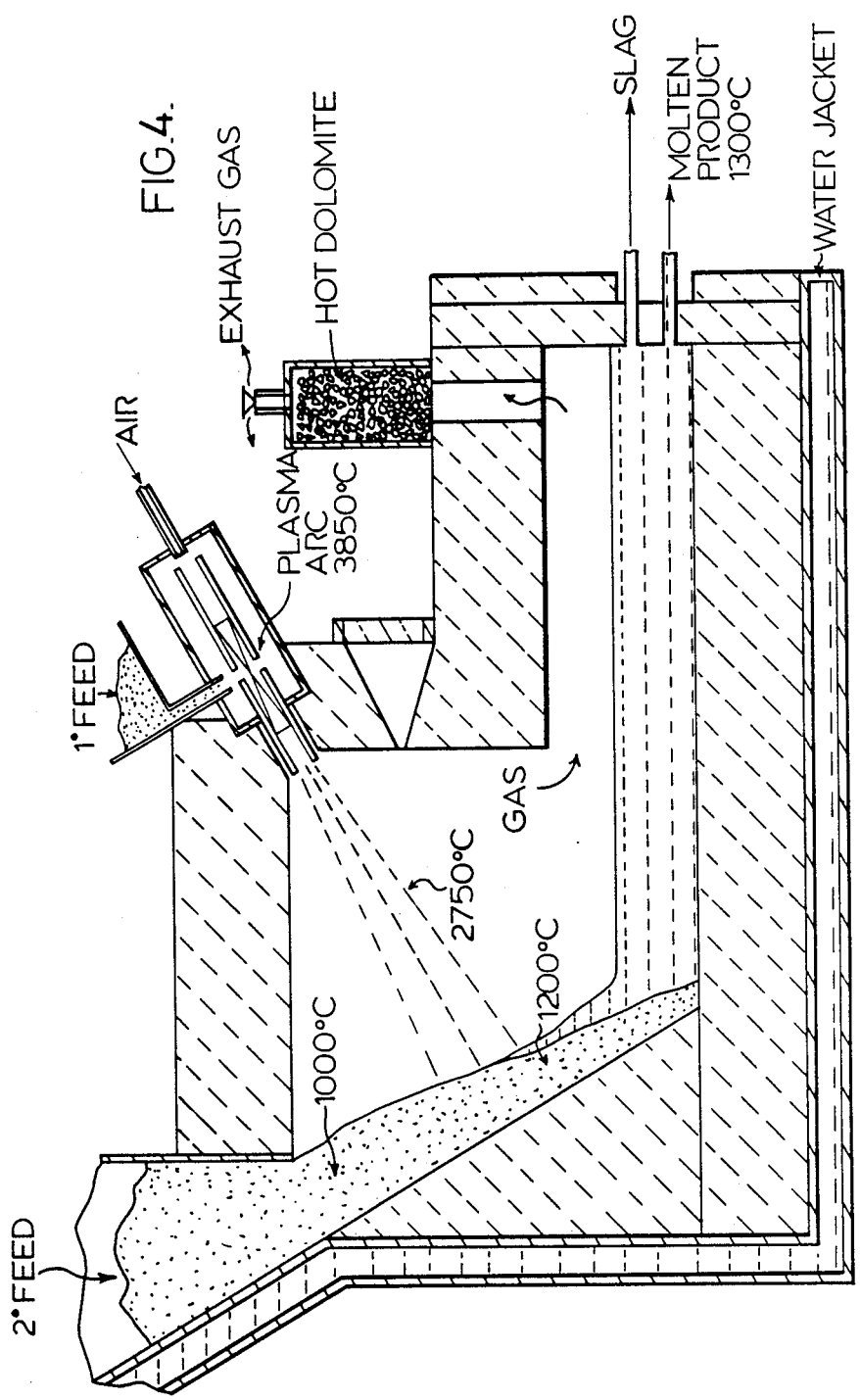

PRODUCTION OF COMPOUNDS BY REACTION OF SOLID MATERIALS AT HIGH TEMPERATURES PRODUCED BY PLASMA ARC TORCHES

FIELD OF THE INVENTION

The present invention relates to the production of various compounds, including strontium ferrites, using plasma arc processing.

BACKGROUND OF THE INVENTION

Plasma arc torches are used in many commercial operations to generate very high temperature streams of gas, to spray molten metal onto machine parts, to cut materials in the same manner as a cutting torch, and to provide reliable ignition for large coal-fired boilers.

Some applications of plasma arc torches are based on high temperature reaction between high temperature gas and solid particles fed through the torch. Some mixtures of two or more solid material can be fed to the torch and formed into a new compound under the high temperature conditions produced by the plasma arc.

In a plasma-arc operation, a stream of gas is ionized, thereby forming a conductive plasma which may assist in transporting fine solid particles.

Very high temperatures are produced in the plasma-arc, and may be as high as 3850° C. (7000° F.) with the temperature of solid particles leaving the torch being as high as 2750° C. (5000° F.), well above the melting temperature of most solid materials.

One potential product of plasma arc processing is strontium hexaferrite ($SrO.6Fe_2O_3$), which is used for making ceramic-type ferrite magnets. If about 6 moles of high purity (about 99.6% pure) hematite ($Fe_2O_3$) is mixed with one mole of high purity (about 98% purity) strontium carbonate ($SrCO_3$) and the mixture is passed through a plasma torch, then most of the mixture of melted particles, on leaving the torch and solidifying, is converted to strontium ferrite, usually to the extent of about 30 to about 70% of the feed.

A much more interesting feed consists of a mixture of 6 moles of hematite, 1 mole of celestite (strontium sulphate), and 1 mole of sodium carbonate or calcium carbonate. When this mixture is smelted conversion to strontium hexaferrite is usually between about 70% and 90%. The sulphate radical from celestite is combined with either the sodium or calcium carbonate to produce sodium or calcium sulphate.

The strontium ferrite which results from these procedures is ground so that impurities can be magnetically separated from the product, since the unconverted hematite, residual strontium oxide and other impurities, such as sodium or calcium sulphate, are non-magnetic while the strontium ferrite is highly magnetic.

If desired, the heat contained in the product, which may leave the arc at a temperature of about 2750° C., can be partially recovered from cooling water and recycled hot gases.

One of the problems of such plasma arc processes is the extreme temperature of the product emanating from the plasma gas stream and the inefficient recovery of heat in the plasma gas stream. In addition, if impure starting materials are used, the impurities become associated with the product and are difficult to separate adequately. In the case of strontium ferrite, another problem is the extremely aggressive nature of the molten material, which is a good solvent for almost all refractory materials, such as aluminum oxide, magnesium oxide and silica.

SUMMARY OF THE INVENTION

In accordance with the present invention, these prior art problems of solid-to-solid reactions using plasma arc torches are overcome by the utilization of a combination of primary and secondary feeds of reactants. The primary feed of reactants passes through the torch and is heated by the plasma gas and the secondary feed of reactants is contacted by the molten primary feed product so as to be heated by the heat contained in the plasma gas stream and the primary feed product to a molten condition, so that further reaction can occur.

In the present invention, therefore, the hot gas and hot entrained reaction products from the primary feed encounter the much colder secondary feed material on the walls of the furnace, decreasing any overheating or "flashback" problem in the plasma-arc chamber. The molten reaction product heats the colder secondary feed to a higher temperature, thereby recovering heat from the primary feed and producing a cooler melted pool of combined reaction product.

The ratios of the weights of reactant mixtures in the primary and secondary feeds may be varied to permit the desired combined temperature to be achieved. For example, for a molten primary reaction product having a temperature of about 2750° C., a secondary reaction mixture temperature of about 1000° C., and a ratio of reactants mixture of about 50:50 in the primary and secondary feeds, then the result is to heat the secondary feed to about 1300° C., while recovering heat from the primary reacted feed and producing a melted pool of combined product at a temperature of about 1300° C.

Since the reacted primary feed is acting as a heat transfer medium in this invention and one of the functions of the gas stream is to transfer heat from the arc to the final product, the proportion of plasma gas to feed required may be decreased significantly. The decrease in gas quantity and velocity are a major advantage, in that a decreased dusting and a decreased requirement for furnace cross-section for successful operation result.

In addition, impure starting materials, for example, the strontium ore celestite, can be employed in the secondary feed, since a molten slag layer composed of impurities in the ore, fluxed by suitable additives, separates and floats on the molten product, as a result of the slag being only about one half the density of the product. The cost of production of a desired product, therefore, may be decreased in some instances by the ability to use impure starting materials for the secondary feed, and by the addition of slag-forming ingredients to the secondary feed pellets.

BRIEF DESCRIPTION OF DRAWINGS

FIG. 1 is a schematic representation of a typical plasma torch useful in the present invention;

FIG. 4 is a schematic representation of a plasma-arc furnace for solid-solid reactions in accordance with a third embodiment of the invention; and FIG. 5 is a phase diagram for the system $SrO-Fe_2O_3$.

DESCRIPTION OF PREFERRED EMBODIMENTS

Figure 2:
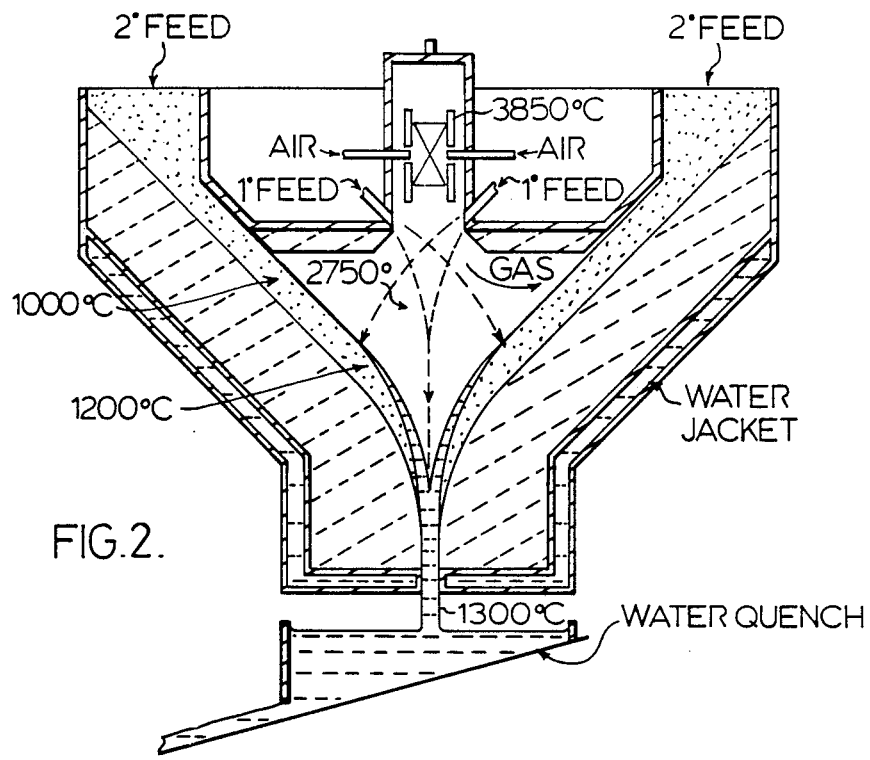
FIG. 2 is a schematic representation of a plasma-arc furnace for solid-solid reactions in accordance with one embodiment of the invention.

Referring to the drawings, a plasma torch useful in this invention is illustrated in FIG. 1 and may consist of a pair of closely-spaced tubular water-cooled electrodes within which an electric arc discharge is magnetically rotated at extremely high speeds. During operation, a process gas is injected into the arc through a spacing between the electrodes of typically approximately 1 mm.

Sparkover between the electrodes initiates the arc discharge when the power supply is energized. The arc is immediately blown to the interior of the electrode by the incoming process gas. The arc current interacts with a magnetic field established by solenoid field coils located around both the upstream and downstream electrodes to rotate the arc at typically approximately 1000 revolution per second. The combination of high arc rotation speeds and high gas flow rates provides excellent heat transfer between the electric arc and the incoming process gas while also maintaining electrode life. It is this excellent arc/gas interaction which produces the superheated process gas and leads to the high thermal efficiencies obtained for this type of torch. The superheated gas exits at the downstream end of the torch.

In FIG. 2, there is illustrated one embodiment of the invention for the production of strontium ferrite. As illustrated therein, the lining of the furnace is formed of strontium ferrite which is cooled by an outer water jacket.

A primary feed of a mixture of 1 mole $SrCO_3$ and 6 moles $Fe_2O_3$ (both high grade), which typically may be in the form of 1 mm diameter pellets formed from 90% −325 mesh particles, is fed into the gas emanating from the plasma arc to form a molten product stream which engages a secondary feed of pellets containing 1 mole $SrCO_3$ and 6 moles $Fe_2O_3$ (both high grade) along with 0.8% $Na_2SO_4$ and 0.2% boron oxide, which are incorporated in the pellets as fluxes, which also typically may be in the form of 1 mm diameter pellets. The secondary feed is supported on the strontium ferrite lining to the furnace. The heat present in the molten product of the primary feed transfer to the cooler secondary feed, causing further reaction to occur and the production of a molten product stream, which may be discharged to a water quench bath for recovery of strontium ferrite products.

In initiating the reaction of this embodiment, the furnace wall is first heated to a temperature of about 1000° C. and the primary feed is then started in the plasma arc and the very hot reaction product impinges on the furnace walls heating them to above their melting point (1500° C.). The walls are water-cooled to maintain a reasonable thickness of the strontium ferrite. Accidental temporary increases in furnace temperature only result in melting additional strontium ferrite from the existing walls, so that no contamination of the product can occur as a result.

By incorporating small quantities of sodium sulphate and boron oxide, or other similar flux materials, into the secondary feed, the overall melting point of the product is lowered, typically to a temperature of about 1300° C. while the melting point of the strontium ferrite water-cooled lining is about 1500° C.

The small amount of sodium sulphate dissociates in the molten bath, is driven off and may be collected, as illustrated in FIG. 4, along with exhausted sulphur dioxide.

In addition to strontium carbonate, the process of FIG. 2 may utilize strontium oxide or celestite, i.e. strontium sulphate, providing the celestite has a significant purity, usually in excess of about 92%, in combination with ferric oxide in the primary and/or in secondary feed.

Figure 3:
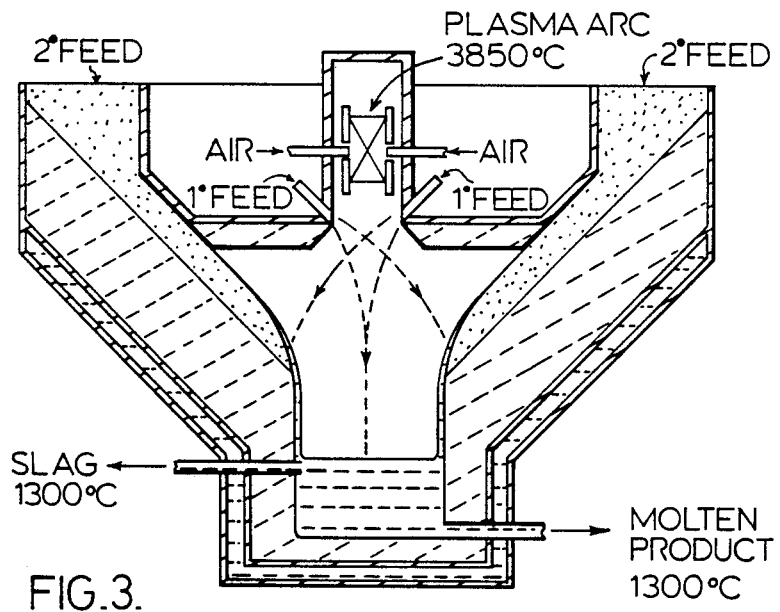
FIG. 3 is a schematic representation of a plasma-arc furnace for solid-solid reactions in accordance with a second embodiment of the invention.

In FIG. 3, there is illustrated a second embodiment of the invention, wherein lower grade strontium-containing reactants are employed in the secondary feed, for example, 80% celestite ore, in combination with ferric oxide, to form strontium ferrite. The impurities which are present in the celestite ore, including significant quantities of calcium carbonate, magnesium carbonate and silica, are removed from the product by forming a molten slag layer separate from the molten strontium ferrite layer. Additions to adjust the relative contents of basic and acid impurities in the concentrate may be made and the product of the process is maintained in a liquid state to permit the lighter slag and heavier product to separate. The molten slag layer and molten strontium ferrite are separately tapped from the product pool.

In operating the process of FIG. 3, it is preferred to provide as the primary feed, the same high purity feed mixture used in the embodiment of FIG. 2, since, in this way, difficulties due to sticking of the product in the torch and the necessity for adjusting the torch conditions are minimized. It is only in the secondary feed that impure starting materials may be employed. The primary feed should preferably always be high purity materials for the reasons indicated earlier.

In the embodiment of FIG. 4, the configuration of the furnace has been modified to permit continuous processing but essentially the same slag separation procedure is effected as in FIG. 3. In the embodiment of FIG. 4 configuration of the furnace, separation of the slag from the strontium ferrite occurs as the molten products flow towards the exits. In addition, as mentioned above, provision is made for collection of sodium and sulphur flashed off from the molten product.

The procedure illustrated in FIG. 4 is the currently preferred method of utilizing the process of the invention. The primary feed is composed of high-grade hematite, fed as relatively coarse particles or as small pellets. Since hematite can revert to magnetite at temperatures around 2700° C., the preferred plasma gas is either air or oxygen.

As shown in the phase diagram for the system $SrO$-$Fe_2O_3$ (FIG. 5), the melting point of strontium hexaferrite ($SrO.6Fe_2O_3$) is 1450° C. Another compound with a mole ratio $7SrO.5Fe_2O_3$ has a much lower melting point of about 1250° C. An embodiment of the method of this invention utilizes a secondary feed containing a strontium compound, such as celestite ($SrSO_4$), in sufficient quantity to provide the ratio representing 7 moles of strontium oxide and sufficient hematite to provide 5 moles of hematite, which melt at about 1250° C.

In this embodiment, the primary feed is then composed only of sufficient hematite to supply the required material to adjust the ratio of $Fe_2O_3$ to $SrO$ to provide the desired product, e.g. the hexaferrite ($SrO.6Fe_2O_3$). The use of such a simple single constituent primary feed has significant practical advantages.

This particular technique is also well suited to the use of sodium carbonate or calcium carbonate as an addition to the secondary feed to combine with the celestite in the secondary feed to form sodium or calcium sulphate, which can be removed from the final product by magnetic separation or by dissolution in water.

A similar very useful technique involves a secondary feed of celestite and hematite, along with slagging and desulphurizing additions, so proportioned as to produce a 7/5 mole ratio compound, a 2/1 mole ratio compound, or a 3/1 mole ratio compound, shown at points A, B and C in FIG. 5, or the eutectic mixture shown at point D. The primary feed in each instance is composed of only high-purity hematite.

The mixture at point D has a melting point of only 1210° C. and is a saleable product.

Existing producers of ferrite powder buy strontium carbonate at around 50¢ a pound to mix with high-purity hematite and pass through rotary kilns to bring about the solid to solid reaction that produces strontium hexaferrite.

The required strontium can be provided by the process of the invention as a eutectic mixture containing about 66% hematite. Adding sufficient hematite to this eutectic mixture to form the hexaferrite is a simple and attractive alternative to the present processing. The step of converting strontium sulphate to strontium carbonate and then reacting it with hematite is eliminated.

An important embodiment of this invention, therefore, is to process celestite ore by smelting it, slagging off impurities, and producing either a saleable eutectic compound with a melting point of about 1210° C. or producing high-grade strontium hexaferrite for processing into ceramic magnets.

It is apparent from the above general description of the invention and the above description of the specific embodiments of FIGS. 2 to 4, that the process of the invention may be used to produce materials other than strontium ferrite.

There are many types of hard and soft ferrite compounds which can be produced in accordance with this invention. In all cases, the preferred primary feed is composed only of high purity hematite which is easily transported through the plasma-arc chamber and is easily reacted with the secondary feed. The final composition of the ferrite is controlled by the ratio of primary to secondary feed and the chemical composition of the secondary feed.

The method of the invention also can be applied to other solid-to-solid reactions. One practical application is in the manufacture of cement. For such a process, a satisfactory primary feed is a finely ground and micropelletized mixture of lime and silica. By maintaining this primary feed at the same analysis and same rate of feed, then the secondary feed can be adjusted to make different types of cement.

There are also apparent advantages in producing some types of glass by the methods disclosed herein.

SUMMARY OF THE DISCLOSURE

In summary of this disclosure, the present invention provides a novel improved procedure for forming products from mixtures of solid reacting particles using gas plasmas. Modifications are possible within the scope of this invention.

What I claim is:

1. A process for reacting solid materials to form a strontium ferrite in the form of a eutectic mixture of SrO and $Fe_2O_3$ by reacting together ferric oxide with at least one strontium oxide-forming compound carried out in a furnace comprising a sloping wall of strontium ferrite, which comprises:

heating a primary feed material comprising a ferric oxide to a molten condition by a plasma gas stream, feeding a secondary feed material comprising at least one strontium oxide-forming compound and including fluxes in sufficient quantity to lower the melting point of said secondary feed material below the melting point of said strontium ferrite wall and effective to form separable slag from impurities in said secondary feed material, in particulate form down said sloping wall, directing said molten primary feed material and said plasma gas stream against said secondary feed material to cause the same to melt and react with the primary feed material to form a strontium ferrite, thereby to form a molten product pool and a liquid layer of molten slag material comprising fluxed impurities in said secondary feed material on the surface of said product pool, and collecting said product pool and solidifying the same separately from the slag layer.

2. The process of claim 1 wherein said primary and secondary materials are chosen and employed in sufficient quantity to produce a eutectic mixture of SrO and $Fe_2O_3$.

3. The process of claim 1 wherein said primary and secondary materials are chosen and employed in sufficient quantity to produce a eutectic mixture of $3SrO.Fe_2O_3$.

4. The process of claim 1 wherein said primary and secondary materials are chosen and employed in sufficient quantity to produce a eutectic mixture of $2SrO.Fe_2O_3$.

5. The process of claim 1 wherein said primary and secondary materials are chosen and employed in sufficient quantity to produce a eutectic mixture of $7SrO.5Fe_2O_3$.

6. The process of claim 1 wherein said primary and secondary materials are chosen and employed in sufficient quantity to produce a eutectic mixture of $SrO.6Fe_2O_3$.

7. The process of claim 1 wherein said primary feed material and said secondary feed material have substantially the same chemical composition.

8. The process of claim 7 wherein said primary and secondary feed materials comprise a mixture of strontium carbonate or strontium oxide and ferric oxide (hematite), so as to form a strontium ferrite.

9. The process of claim 7 wherein said primary and secondary feed materials comprise a mixture of strontium sulphate, ferric oxide (hematite) and sodium or calcium carbonate.

10. The method of claim 1 wherein said strontium oxide-forming compound is selected from strontium carbonate, strontium oxide or strontium sulphate.

11. The method of claim 1 wherein said strontium oxide-forming compound is celestite ore.

12. The method of claim 11 wherein the primary feed material is a single component feed consisting essentially of high grade hematite.

13. The method of claim 12 wherein said secondary feed material contains sodium carbonate or calcium carbonate and any of said sodium carbonate or calcium carbonate present in said solidified strontium ferrite is removed therefrom.

* * * * *